United States Patent [19]

Spain

[11] 3,708,789

[45] Jan. 2, 1973

[54] THIN FILM BINARY DATA INFORMATION STORES

[75] Inventor: Robert J. Spain, Ville D'Avray, France

[73] Assignee: Compagnie Internationale Pour L'Informatique, Les Clayes-sous-Bois, France

[22] Filed: Jan. 19, 1971

[21] Appl. No.: 107,860

Related U.S. Application Data

[63] Continuation of Ser. No. 808,763, March 20, 1969, abandoned.

[52] U.S. Cl.....340/174 BC, 340/174 TF, 340/174 S, 340/174 GP

[51] Int. Cl.............................G11c 11/14, G11c 5/02

[58] Field of Search....340/174 BC, 174 TF, 174 GP, 340/174 S

[56] References Cited

UNITED STATES PATENTS 3,422,410 1/1969 Bartik............................340/174 BC

OTHER PUBLICATIONS

IBM Technical Disclosure Bulletin, "Coupled Film Memory" by Louis, Vol. 7, No. 6, 11/64; pages 483–484.

IBM Technical Disclosure Bulletin, "Magnetic Film Storage Configuration" by Bertin, Vol. 8, No. 3; 8/65; p. 441.

*Primary Examiner*—Stanley M. Urynowicz, Jr.
*Attorney*—Kemon, Palmer and Estabrook

[57] ABSTRACT

In a magnetic memory store in which the material of the memory points consists of anisotropic magnetic material and which is controlled from at least two arrays of conductors of distinct relative orientations, magnetostatic shielding means provide a control of the apparent coercive field of the magnetic material from a higher value between the time intervals of the selection controls to a lower value during such time intervals.

10 Claims, 14 Drawing Figures

INVENTOR

Robert J. Spain

Kemon, Palmer & Estabrook

ATTORNEYS

INVENTOR
Robert J. Spain
Kemon, Palmer & Estabrook
ATTORNEYS

INVENTOR
Robert J. Spain
Kemon, Palmer & Estabrook
ATTORNEYS

THIN FILM BINARY DATA INFORMATION STORES

This is a continuation of my prior application S.N. 808,763 filed March 20, 1969 now abandoned.

SHORT SUMMARY OF THE INVENTION:

The present invention concerns improvements in binary data magnetic stores of the kind which include the combination of anisotropic magnetic material storing means, comprised of a plurality of one-bit memory points, and of first and second arrays of control conductors of distinct relative orientations. The anisotropic magnetic material is usually ferromagnetic, having an easy axis of magnetization, and usually the arrays of conductors are arranged relatively perpendicular to each other and the places of relative crossing coincide with the locations of the said memory points. The orientation of one of the conductor arrays is along the easy magnetization axis. The memory points are arranged as a layer, the word "layer" including a continuous structure such as a strip or a structure of distinct memory points.

Briefly summarized, the operation of this kind of store may be stated as follows:

For a read-in operation, one of the conductors of the array oriented along the direction of the easy magnetization axis is activated by a temporary electric selection signal and the magnetization of any and all memory points over which the conductor passes rotates towards a direction substantially perpendicular to that of the easy magnetization axis, which consequently is toward the difficult magnetization axis. Before this selection signal ends, the binary bit information signals, of a first polarity for the representation of the binary digit 1 and of the opposite polarity for the representation of the binary digit 0, are applied to the conductors of the other array and such information signals continue until after the end of the selection signal. After these signals disappear, the magnetizations at the memory points rotate back to the orientation of the easy magnetization axis according to individual directions defined by the polarities of the corresponding information signals.

For a read-out operation, only the selection current as above first mentioned is applied to a conductor of the same array, with the same result on the memory points concerned as to the rotations of their magnetizations. As no information signals are applied, the conductors of the other array, and of a further and third array paralleling it, develop individual output and read-out currents of polarities defined by the directions of angular rotation of the magnetization. Without further provision, the read-out is destructive of the previously recorded information but known expediencies, outside the scope and field of the present invention, are available for avoiding such destruction if desired.

In stores of this kind however, the magnetizations of the memory points are subjected to parasitic actions tending to deteriorate the information content of the store; e.g. creep of the walls of the magnetization fields of the memory points, demagnetizing fields resulting from the read-in and read-out operations and/or from external phenomena from the environment of the store.

It is known that the higher the coercive field of a magnetic material, the lesser the deterioration of the magnetization condition due to the actions of the above recited parasitic phenomena. It is also known that the higher the coercive field of an anisotropic magnetic material, the higher the dispersion of the orientations of the magnetic spins at each memory point in such a material with respect to the easy magnetization axis. From another point of view, the higher the coercive field of the material, the greater the thickness which can be used for the layer at each memory point because the creep is reduced as the coercive field is increased, and an increase in thickness results in a higher level of the read-out signals.

It is an object of this invention to provide magnetic stores of the kind above described which behave as if their coercive field was appreciably increased without any appreciable increase of their anisotropic dispersion, whereby the stores are protected against the above recited deleterious phenomena.

According to a feature of the invention, a magnetostatic shielding arrangement is included in the structure of the store. During the intervals of operations of the store, this provides an efficient protective action against creep and spurious de-magnetizing fields of all kinds due to the apparent increase of coercive field provided by the shielding arrangement for the magnetic memory points in the store. Such action is temporarily and selectively removed during read-in and read-out operations wherein at least one conductor of at least one array is electrically activated and controls the shielding action along its path over the memory points, by saturating the magnetic material in said shielding arrangement at such memory points which are located to cooperate with that conductor for a particular operation.

DETAILED DESCRIPTION

Figures 1, 2, 3, 4, 5, 6, 7, 8:
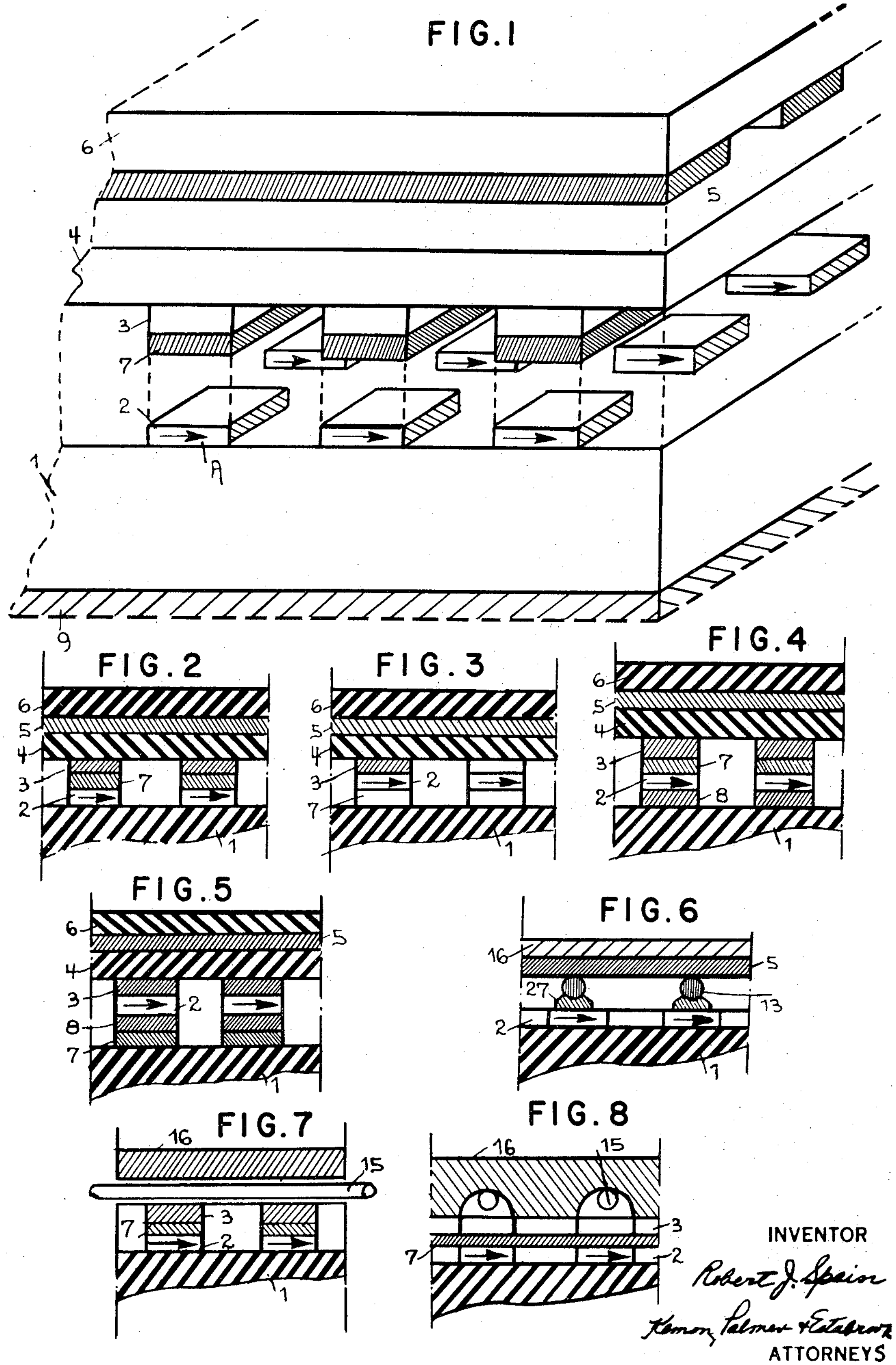
FIGS. 1 and 2 respectively show in an exploded view and a cross-section view, a first embodiment of a binary data information store according to the present invention.
FIGS. 3 to 9, in partial cross-section views, show various modifications of the embodiment of FIGS. 1 and 2.

In FIGS. 1 and 2, memory points 2 are made of an anisotropic magnetic material, preferably ferromagnetic, the axis of easy magnetization of which is shown at A. These members comprise a thin layer of film over an insulating substrate 1 which may be glass or ceramic. The lower face of the substrate 1 may, if needed, be coated with a conductive "ground" plane 9. The distinct memory points 2 are shown arranged in a matrix on the substrate 1, as a possible embodiment thereof. It is not at all imperative that their areas be square and their spacing equal to the length of one of their sides: for instance, and illustratively, each memory point of a practical embodiment of the store was 0.6 mm long parallel to the axis of easy magnetization A and 0.3 mm long in the direction perpendicular to A. Each point may, for instance, be of the order of 1000 A of thickness though such a value is not at all critical. Preferably, though not imperatively, the material of the memory points is made of the well-known alloy comprising 80 percent nickel and 20 percent iron and is applied to the substrate by any known process with the application of a D.C. orientating magnetic field during deposition to define the easy magnetization axis A.

An array of conductive strips 3 is formed on a thin sheet 4 of an insulating material such as the one known under the commercial name of "Mylar". These strips are parallel to the difficult magnetization axis which is perpendicular to the easy magnetization axis A. They are, for instance, made of copper having a thickness of the order of 5$\mu$ and may be formed by laminating copper over the sheet or by deposition from an electrochemical process, or any other known method for coating copper over Mylar. A soft magnetic material is coated over the strips 3, such for instance as the above defined nickel-iron alloy. The strips of soft magnetic material 7 may be made isotropic, and consequently of a very low, if not zero, coercive field, by the application of a rotating magnetic field during their deposition. The isotropic character of these strips ensures the magnetostatic shielding effect which is required by the present invention. However, it is also possible to obtain such a magnetostatic effect, at a lesser but often sufficient degree, by forming the strips 7 of anisotropic character provided the easy magnetization axis of the material of said strips is perpendicular to the easy magnetization axis A of the material of the memory points. By way of example, the thickness of said strips 7 may be of the order of 5,500 A in both cases.

The width of the strips 7 and conductors 3, and their relative spacing correspond substantially to the width and spacing of the memory point along the same direction. Actually, it seems preferable to provide the strips 3–7 of slightly greater width than the spacing of said memory points 2 in that direction.

A further insulating sheet 6 carries further conductive strips 5 which parallel the easy magnetization axis A. The dimensions of strips 5 may be similar to those of the conductive strips 3.

Illustratively, the thickness of the sheets 4 and 6 may be of the order of 10 $\mu$. For the sake of clarity the drawings are on an exaggerated scale.

As shown in FIG. 2, the elements described above are piled in a sandwich to obtain the final structure of the store.

For a read-in operation, one of the conductors of the array 5 is activated by a temporary electric selection signal. Its action is first to control the saturation of the magnetostatic shield at any memory points over which the activated conductor 5 passes and to control the magnetization in any and all memory points over which it passes towards a direction substantially perpendicular to that of the easy magnetization axis of the material of the memory points 2. Before this selection signal ends, the binary bit information signals, of a first polarity for the representation of the binary digit 1 and of the opposite polarity for the representation of the binary digit 0, are applied to the conductors 3 of the other array and said information signals are then effective to control the return of the rotated magnetization towards the easy magnetization axis in the selected memory points. After all signals disappear, the magnetizations of the memory points complete their return to the orientation of the easy magnetization axis according to the individual directions defined by the polarities of the information signals which have been applied to conductors 3. The magnetostatic shield is no longer saturated and therefore isolates the memory points of the store in the same way as during its unsaturated (as not selected by the current in the selected conductor 5) condition it maintained isolated from any spurious magnetic field control action the unconcerned memory points for a read-in operation.

For a readout operation, the overall operation is the same as concerns the magnetostatic shield member as it is saturated by the selection signal or current in a selected conductor 5, and remains unsaturated at any other memory point; the conductors 3 (or 8 when provided) developed individual output and readout currents of polarities defined by the direction of angular rotation of their magnetization.

In the modification shown in FIG. 3, the relative positions of the layers 7 and 2 are reversed with respect to that of FIG. 1. The strips 7 are first formed over the substrate 1, electrochemically for instance, and then coated over by the memory points 2. The arrays of conductors 3 and 5 are separately formed and applied. Of course, said layers may be made on opposite faces of a single insulating thin sheet if desired.

The memory points need not be distinct but may be merely defined, in a continuous magnetic material layer, by the cross-over points of the arrays of conductors. As an alternative, they may consist of thus defined points in elongated magnetic strips extending parallel to the direction of one of the arrays of conductors.

In operation of the store, the conductors 3 are fundamentally used as information carrying conductors whereas the conductors 5 are used as selection control conductors. Since it may be desirable to have separate conductor arrays for the read-in and the read-out information, this may be made as shown in FIG. 4 by inserting in the store a further array of conductors 8, parallel to the conductors 3 and, for instance, formed on the substrate 1 beneath the plane of the memory points. Such additional conductors 8 can also be interposed between the magnetostatic shielding strips 7 and the memory points, as shown in FIG. 5.

Due to the very small thicknesses of the layers the conductors 5 could be provided on the substrate 1 beneath the plane of the memory points. It is also conventional in magnetic stores of this kind to insert the plane of the memory points between the arrays of conductors instead of placing the arrays on one side only of the plane of memory points.

Instead of forming the conductors of at least one array as metallic deposits on insulating sheets, these could be provided as thin insulated (enameled) copper wires when problems arise concerning the impedance matchings with external circuits such as electrical current generators and amplifiers. By way of illustration, FIGS. 6 to 9 show varied arrangements having recourse to such thin wire conductors (shown of circular cross-section though this is by no way imperative of course).

In FIG. 6, the conductors 13 are only used for the information array. The soft shielding magnetic material may be coated, as shown at 27, over said wires 13 but on a preferably restricted angular coverage on the side of said wires facing the plane of the memory points. The other array of conductors 5 is maintained as a metallic deposit on a carrier 16 which may then advantageously be a soft magnetic material plate to serve as a flux closing yoke. In the preceding embodiments, the sheet 6 could have been such a plate or a yoke plate could have been applied over the said sheet 6.

In FIG. 7, on the other hand, the conductors 3 are thin metallic deposits over soft magnetic strips 7 and the selection control conductors are made of thin insulated wires 15 within grooves of the yoke plate 16. FIG. 8 shows a cross sectional view of such an arrangement. view. The plane of memory points is made as a continuous layer, or at least as an array of continuous strips underlying the strips 7 and 3 coating the material of the memory plane. Of course, this is a variation possible only for the arrangement of FIG. 1.

Figures 9, 10, 11:
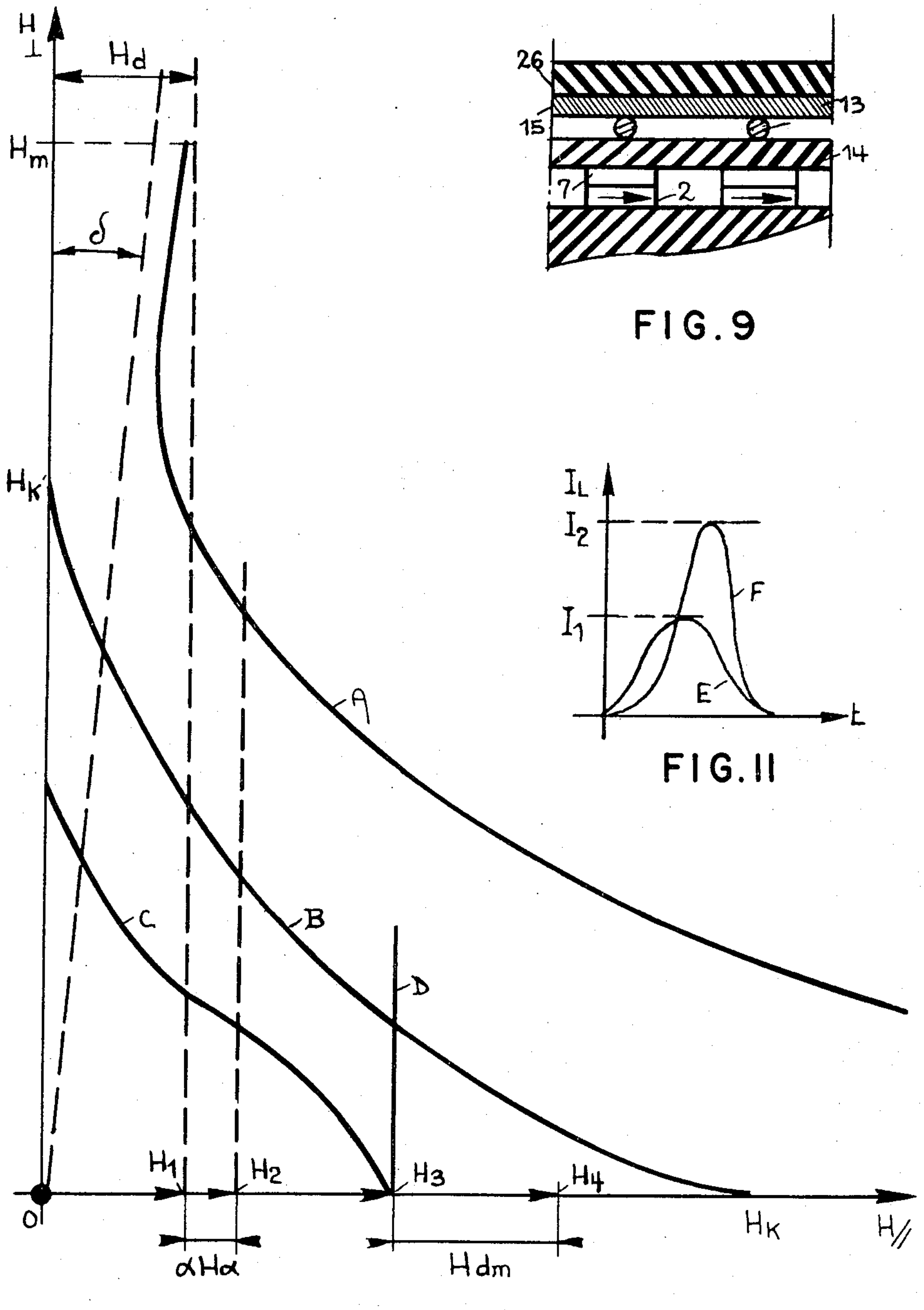
FIG. 10 is a diagram aiding the explanation of the operation of the embodiment of FIG. 1.
FIG. 11 is a diagram concerning said operation.

In the view embodiment of FIG. 9, the structure comprises two arrays of thin insulated wires 13 and 15, "glued" on thin insulating sheets 14 and 26, respectively. Sheet 14 may be omitted by glueing the wires 13 directly on the members 7. Both arrays of conductors can also be superimposed within relatively perpendicular grooves of a yoke plate such as 16.

Whatever the choice among the above described embodiments for putting the invention into actual practice, the result of the invention is as follows:

In conventional structures of stores of the general kind herein above defined, the coercive magnetic field $H_c$ of the memory points has a value of the order of 160 AT/M (One Oersted substantially equals 80 AmpereTurns per Meter). The field of anisotropy $H_k$ is of the order of 300 AT/M. The control of the memory points for a read-in operation may be ensured with a "-word" selection field $H_m$ substantially equal to 1.5 times the value of the field of anisotropy $H_k$, i.e., a value of about 450 AT/M, and an information field $H_d$ the value of which is substantially lower than 100 AT/M and may be said to substantially correspond to the sum of the de-magnetizing field and the dispersion in the material. The figure of merit for the resistance of one memory point against the disturbances is defined by the ratio of the minimum to the maximum value of the information magnetic field, said ratio being at most 1.6 for the above values.

The provision of the magnetostatic shielding arrangement according to the invention introduces an additional parameter which, when no control magnetic field exists (no electrical current in any control conductors) actually ensures a protection of the magnetization condition of the memory points against spurious effects. However, when one selection control conductor is activated, which generates a magnetic field of a sufficient value for locally saturating the material of said shield at the cross-over points between said conductor and said shield, saturation field simulates an increase of the coercive field of the memory point material. In other words the conditions are apparently those of a magnetic memory material the coercive material of which has a coercive magnetic field of a value equal to the added values of the actual coercive field $H_c$ and of the said saturation field $H_{dm}$. As $H_{dm}$ is substantially equal to 450 AT/M, the apparent coercive field becomes of the order of 610 AT/M. Of course, the information field must be of an increased value, higher than the product of its former value by the ratio $(H_m + H_{dm})/H_m$. At most, the information field must have a value equal to 200 AT/M. The figure of merit raises to about 3.05, or nearly double the value without application of the present invention in the store. The value of the selection field remains unchanged. By maintaining at a constant value the coefficient:

$$(H_d \cdot H_m/H_m + H_{dm}), \qquad \text{(i)}$$

for instance at a value of the order of 100 AT/M in the concerned example, it is plain that one may choose the values of the selection field, information field and saturation shielding field (this latter being controlled from a choice of thickness of the shielding layer) so that practically any condition can be satisfied for the values of the fields $H_d$ and $H_m$. More particularly, the choice of a value for $H_m$ lower than the value of the field of anisotropy $H_k$ enables a non-destructive read-out of the store.

In the diagram of FIG. 10, the ordinate axis is oriented along the direction of the difficult axis of magnetization of the memory point material, $H\perp$, and the abscissa axis, along the direction of the easy magnetization axis, $H_{//}$. The dispersion of anisotropy is shown at δ. The field $H_d$ must have the minimum value shown at $H_d$, the sum of the minimum information field $H_1$ without shield and of the dispersion. When the shield is omitted, the maximum permissible value for $H_d$ is $H_3$ coincident with the value of the actual coercive field $H_c$ of the anisotropic material.

Curve C shows the variation of the creep with respect to the values of $H_m$ and $H_d$. Curve B shows the variation, for $H_k$ of constant value, of the ratio of $H_m$ and $H_d$ i.e., the variation of the critical value of said ratio for a partial rotation of the magnetization in the memory points. In order that the magnetization may have its orientation changed from a displacement of the walls of the magnetized area of a memory point, that part of the plane above curve B must be reached, i.e., a condition marked by D in the diagram. For a magnetic material having a certain value of intrinsic coercive field $H_c$, and without any shielding, said condition defines the necessary values of $H_m$ for a read-out. Curve A defines the necessary value of the threshold for a read-in operation. The composition product of $H_d$ and $H_m$ (of relative perpendicular orientations) must be higher than this threshold for enabling the read-in in the anisotropic material.

Now, considering a store made according to the invention, the information field remains zero in the absence of the selection field and the magnetic material of the memory points is maintained within the stable region with respect to the creep and the action of spurious demagnetizing fields which may appear, such region being the one below curve C in the diagram.

$H_2$ is the minimum value the information field must have for a read-in operation, the difference between the values $H_1$ (minimum information field without shield) and $H_2$ (minimum information field with shield)

being proportional to $H_d$ by a coefficient $\alpha$ equal to $H_{dm}/H_m$.

$H_4$ is the maximum value the said information field can take. Said value is equal to the sum of $H_c$ (value of the coercive field at $H_3$) and $H_{dm}$ (value of the saturation field of the material of the shield). It is consequently clear that the apparent value of the coercive field of the memory point material has been increased from the provision of the magnetostatic shield, whereas, the increase of the dispersion is practically nil.

It is further clear from the diagrams that when the magnetostatic shield is present in the structure of the store, one may choose a value of the information field $H_d$ of a lower value than $H_4$, for which the value of the selection field $H_m$ is lower than $H_k$; consequently, a non destructive read-out can be obtained when the effect of the shield "disappears" at the generation of such a selection field. The disappearance of this effect delays the instant of generation of the information currents representative of the read-out information bits, see curve F of FIG. 11, with respect of the instant of appearance of corresponding currents, curve E of same FIG. 11, for an unshielded structure. However, as described and shown in this FIG. 11, the peak amplitude of the information current at such a read-out is higher, as shown at $I_2$, in a store according to the invention, than the corresponding peak amplitude, $I_1$, in a conventional store of the same kind. In actual practice, the peak amplitude of the read-out signals will be substantially twice that of the conventional store. This result will be the higher as the thickness of the material of the memory points is increased with respect to possible thickness of such material in conventional structures wherein the range of thicknesses was imperatively limited not to unduly increase the effects of creep, spurious demagnetizing fields and anisotropic dispersion.

It is now obvious that the provision of the magnetostatic shielding means according to the invention results in the following advantages:- apparent increase of the coercive field of the memorization arrangement, hence increase of protection of the contents of the store against creep and other spurious effects, as the material of the memory points is maintained, between the intervals of operation, in a region of stable magnetization of said points, and actual increase of the read-out information currents.

Figure 12:
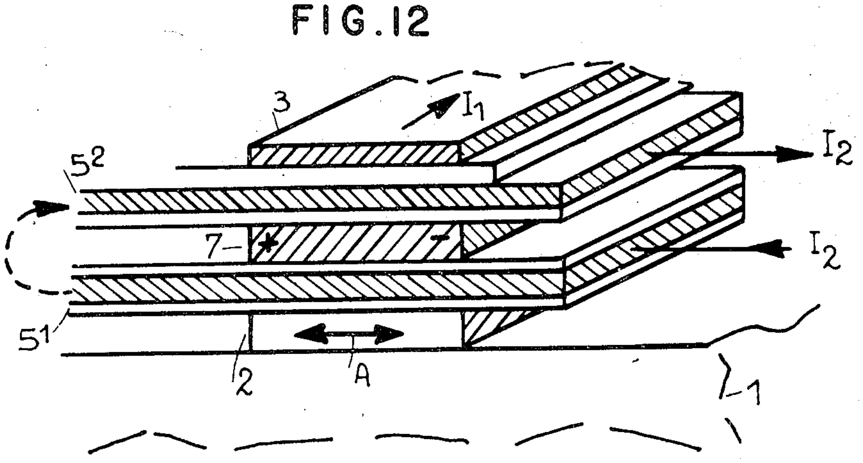
FIG. 12 shows a partial view of a second embodiment of a binary data information store according to the invention.
Figure 14:
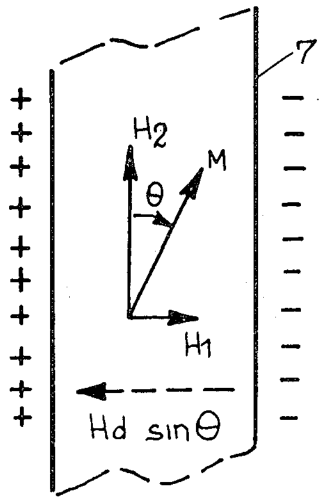
FIG. 14 shows a portion of the magnetostatic shield in stores according to FIGS. 12 and 13.

In the embodiment of FIG. 12, the memory points 2, of same character as in the preceding embodiments, are considered as located along anisotropic magnetic strips of the same orientation as that of the conductors 3 of the first array of control conductors. The magnetostatic shielding arrangement is made of similarly oriented strips of an isotropic soft magnetic material. The other, or second, array of conductors is divided in two parallel layers of conductors $5^1$ and $5^2$, respectively arranged on opposite sides of the layer of magnetostatic shielding strips 7, with the conductors $5^1$ thus inserted between the plane of the memory points and the magnetostatic shield arrangement, and with the conductors $5^2$ inserted between said magnetostatic shield arrangement and the conductors 3. Each pair of registering conductors $5^1$ and $5^2$ is simultaneously fed, for a selection control, with an electrical current $I_2$ which flows in opposite directions from conductor $5^1$ to conductor $5^2$. These conductors are, for instance, interconnected by one of their ends, or have terminals on opposite ends thereof for such a condition of passage of electrical current. The conductors 3 are adapted to receive selection control currents $I_1$. When two of the said conductors, 3 and $5^1$–$5^2$ are simultaneously activated, they generate respective magnetic fields $H_1$ and $H_2$, field $H_2$ oriented along the longitudinal axis of the shielding strip and field $H_1$ perpendicularly to said direction as shown in FIG. 14. The orientation of the magnetization in the shielding layer 7 at the cross-over point of the conductors is thus brought to an orientation such as shown at M, with an angular shift by $\theta$ from the longitudinal axis of the shielding strip 7. To cancel of the shield effect, it is necessary that the field $H_d$, demagnetizing component existing in the strip 7 (as indicated by the + and − electrical free charges at the edges of 7), and which is transverse to the strip in the shield, be lowered to a value capable of saturating the magnetic material of said strip 7 at the concerned location. The demagnetizing component actually is $H_d$. sin $\theta$, so that for small values of $\theta$, the following relation is substantially satisfied when $H_1$ is lower than or equal to $H_d$:

$$\theta \doteq (H_1/H_2 + H_d). \qquad \text{(ii)}$$

The resulting field, $H_p$, near the memory point layer 2 at such location as defined by the activated conductors, is given by the relation $$H_p = H_1 - H_d \cdot \sin\theta, \qquad \text{(iii)}$$

and, consequently, from relation (ii):

$$H_p = (H_1 \cdot H_2/H_2 + H_d). \qquad \text{(iii)}$$

From the above relations, it can be directly seen and appreciated that when either one of the currents $I_1$ and $I_2$, or both of them, are zero, the field $H_d$ is zero too. The magnetostatic shielding action, protecting the content of the memory points in the store against spurious phenomena as the magnetic creep and parasitic demagnetizing fields, is thus maintained during any condition other than a read-in or read-out operation for the memory points solely concerned by said operation. The application of the control field $H_2$ results in the orientation of the magnetization vector in the anisotropic material of the memory point along the direction of the easy magnetization axis A. The set of such an orientation of the magnetization results from the "sign" of the field of composition of the control field, which obviously is controlled from the direction of flow of current $I_1$, or the polarity of said current $I_1$, which orient the field component $H_1$ according to one or the other direction of the easy magnetization axis A.

For a read-out, the selection must imperatively comprise application of both currents $I_1$ and $I_2$. The read-out signals will be formed in a third array of conductors, as previously described for certain of the above disclosed embodiments, such additional conductors being, for instance, inserted between the plane of memory points and the control and shield arrangement associated therewith.

Whereas the preceding reasoning is given under certain assumptions, in order to clearly define the results of the provision of magnetostatic means in a magnetic store structure, such results are maintained when these assumptions are not satisfied, i.e., for a wider value of $\theta$, and a width of conductors 5 substantially equal to that of conductors 3 (the above assumed a width of conductors 5 appreciably higher than that of conductors 3).

The thin insulating layers in the structure of FIG. 12 are shown but not specifically numbered, as their position and part are quite apparent.

Figure 13:
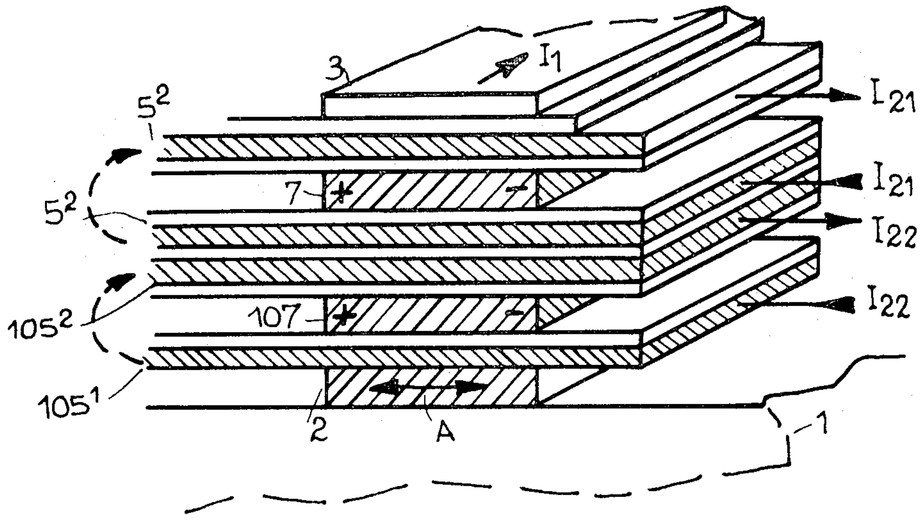
FIG. 13 shows a modification of the arrangement of FIG. 12.

With the last contemplated embodiment of the invention, i.e., the one in FIG. 12, one may contemplate stores wherein selection operations can include logical conditions to be satisfied for a read-in or read-out operation. For instance, FIG. 13 shows a structure wherein a selection operation for read-in or read-out involves the recourse to an intersection or logical AND condition. Whereas in FIG. 13, the AND condition only implies two variables, a more complex AND condition may be easily provided, when necessary, by duplicating that part of the structure made of shielding and array of conductors:

Between the selection arrangement of FIG. 12 comprised of the magnetostatic shielding layer 7 and the array of conductors $5^1$–$5^2$ and the layer of memory points 2, is inserted in FIG. 13, a further selection arrangement comprised of a further magnetostatic shielding layer 107 and a two layer array of conductors $105^1$ and $105^2$, of characteristics identical to those of the first. Consequently, the shielding action is solely cancelled, for the layer of memory points 2, when all the currents $I_1$ (conductor 3), $I_{21}$ (conductor 5) and $I_{22}$ (conductor 105) are simultaneously present in conductors passing over a concerned memory point, which constitutes, as obvious, a logical AND operation selection. Following the same reasoning as given for FIG. 12, one may see that the value of the resulting field $H_p$ near said concerned memory point is given by the relation:

$$(v)\qquad H_p=\frac{H_1}{1+H_J\cdot\left(\frac{1}{H_{21}}+\frac{1}{H_{22}}\right)}$$

in which $H_{21}$ is the partial selection field generated from current $I_{21}$, and $H_{22}$ the partial selection field generated from current $I_{22}$, the relation $H_1$ lower than or equal to $H_d$ remaining satisfied. Relation (v) clearly shows that the only condition for $H_p$ not to be zero is that all the operative currents be present and coincident in time and location.

I claim:

1. A binary data information store comprising in combination:
   a. anisotropic magnetic material storing means including a plurality of one-bit memory points arranged in a matrix, said material having easy and difficult axes of magnetization;
   b. at least one first array of parallel conductors oriented along the direction of said easy axis of magnetization;
   c. at least one second array of parallel conductors oriented along the direction of said difficult axis of magnetization;

said arrays of parallel conductors being arranged on the same side of said anisotropic magnetic material storing means;
   d. a layer of saturable magnetic material elements serving as a magnetostatic shield arranged in rows substantially registering with the conductors of said second array and in close proximity to said anisotropic material storing means, both said rows and said means being on the same side of said second array of conductors, (said elements having their material locally magnetized from the registering memory points and having their material locally saturated at their locations registering with an activated conductor in at least said first array of conductors.) said elements each being of a thickness to impede magnetic saturation due to the magnetizing force received from the registering memory points when no conductor of said second array of conductors is activated but having their magnetic material locally saturated at those locations which register with an activated conductor in at least said first array of conductors which activation locally destroys the magnetostatic shield effect of the elements at the said locations.

2. A binary data information store according to claim 1, wherein said rows each comprise an elongated strip along the direction of said difficult axis of magnetization.

3. A binary data information store according to claim 1, wherein said saturable magnetic material is made of a soft isotropic magnetic material.

4. A binary data information store according to claim 1, wherein said saturable magnetic material is made of an anisotropic magnetic material having its difficult magnetization axis oriented along the direction of the easy magnetization axis of the magnetic material of said memory points.

5. A binary data information store according to claim 1, wherein the elements of said saturable magnetic layer are coated over the conductors of said second array.

6. A binary data information store according to claim 1, wherein a third array of conductors of identical arrangement and orientation as the conductors of said second array is inserted between said saturable magnetic layer and the plane of said memory points.

7. A binary date information store according to claim 1, wherein said first array of conductors comprise two layers of parallel and registering conductors arranged on opposite sides of said saturable magnetic layer, the corresponding conductors in said layers being of opposite directions of electrical current paths.

8. A binary data information store according to claim 7, wherein each pair of said corresponding conductors are electrically connected at one of their ends.

9. A binary data information store according to claim 7, wherein a plurality of two layer first array of conductors and saturable magnetic layer assemblies is piled parallel to the plane of said memory points.

10. A binary data information store according to claim 9, wherein a single array of second conductors is provided.

* * * * *